United States Patent
Lapis

(10) Patent No.: US 11,485,370 B2
(45) Date of Patent: Nov. 1, 2022

(54) METHOD FOR DETERMINING A CORRECTED WHEEL RADIUS ON THE BASIS OF THE MEASURED YAW RATE

(71) Applicants: thyssenkrupp Presta AG, Eschen (LI); thyssenkrupp AG, Essen (DE)

(72) Inventor: Leonard Lapis, Sennwald (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 45 days.

(21) Appl. No.: 17/252,512

(22) PCT Filed: Jun. 14, 2019

(86) PCT No.: PCT/EP2019/065695
§ 371 (c)(1),
(2) Date: Dec. 15, 2020

(87) PCT Pub. No.: WO2019/243191
PCT Pub. Date: Dec. 26, 2019

(65) Prior Publication Data
US 2021/0261143 A1    Aug. 26, 2021

(30) Foreign Application Priority Data
Jun. 22, 2018 (DE) .................... 10 2018 115 043.1

(51) Int. Cl.
*B60W 40/12* (2012.01)
*B60W 50/00* (2006.01)

(52) U.S. Cl.
CPC ........ *B60W 40/12* (2013.01); *B60W 50/0098* (2013.01); *B60W 2050/0088* (2013.01); *B60W 2520/14* (2013.01); *B60W 2520/28* (2013.01)

(58) Field of Classification Search
CPC ............ B60W 40/12; B60W 50/0098; B60W 2050/0088; B60W 2520/14;
(Continued)

(56) References Cited

U.S. PATENT DOCUMENTS

2002/0153770 A1  10/2002  Matsuno et al.
2004/0167692 A1   8/2004  Lu et al.
(Continued)

FOREIGN PATENT DOCUMENTS

CN    102138058 A    7/2011
CN    103153758 A    6/2013
(Continued)

OTHER PUBLICATIONS

DE-102010007630-A1 translation (Year: 2010).*
(Continued)

*Primary Examiner* — Jeff A Burke
*Assistant Examiner* — Kyle T Johnson
(74) *Attorney, Agent, or Firm* — thyssenkrupp North America, LLC

(57) ABSTRACT

A method for determining a wheel radius of a motor vehicle, including calculating a yaw rate of the motor vehicle by means of a wheel speed of at least one wheel and a predefined wheel radius. The calculated yaw rate is compared with a measured yaw rate. The wheel speed is adapted. The calculation of the yaw rate is input, of the at least one wheel by means of a correction factor, so that the calculated yaw rate is equal to the measured yaw rate. The correction factor and the predefined wheel radius or the wheel speed is multiplied. The calculation of the yaw rate is input, for the determination of a corrected wheel radius or of a corrected wheel speed.

18 Claims, 2 Drawing Sheets

(58) Field of Classification Search
CPC ............ B60W 2520/28; B60T 2240/07; B60T 2250/03; B60T 8/17551; B60T 8/172
See application file for complete search history.

(56) References Cited

U.S. PATENT DOCUMENTS

| | | | |
|---|---|---|---|
| 2010/0204887 A1 | 8/2010 | Ichinose | |
| 2013/0211676 A1 | 8/2013 | Benyo et al. | |
| 2015/0191158 A1 | 7/2015 | Vorreiter | |
| 2015/0336607 A1 | 11/2015 | Inoue | |
| 2016/0167705 A1 | 6/2016 | Chung et al. | |
| 2017/0061797 A1 | 3/2017 | Lee | |
| 2019/0226841 A1* | 7/2019 | Johansson | ............. B60W 40/12 |

FOREIGN PATENT DOCUMENTS

| | | | | |
|---|---|---|---|---|
| CN | 104411550 A | | 3/2015 | |
| CN | 104955701 A | | 9/2015 | |
| CN | 105691449 A | | 6/2016 | |
| DE | 102010007630 A1 | * | 8/2010 | .......... B60L 15/2036 |
| DE | 102004004805 B4 | * | 12/2010 | ............. B60T 8/172 |
| DE | 10 2012 208 298 A | | 11/2013 | |
| DE | 10 2013 004 900 A | | 9/2014 | |
| DE | 10 2013 014 198 A | | 2/2015 | |
| DE | 102014202230 A1 | * | 8/2015 | .......... B60W 10/184 |
| DE | 10 2016 010 750 A | | 3/2018 | |
| DE | 10 2016 223 902 A | | 6/2018 | |
| EP | 1 577 148 A2 | | 9/2005 | |
| EP | 1 826 530 A | | 8/2007 | |
| EP | 2 287 057 A | | 2/2011 | |
| EP | 2944527 B1 | * | 9/2016 | ............ B60T 8/1706 |
| WO | WO-2012148151 A2 | * | 11/2012 | ................ G01P 3/50 |
| WO | 2014/146821 A | | 9/2014 | |

OTHER PUBLICATIONS

DE-102004004805-B4 translation (Year: 2010).*
WO-2012148151-A2 translation (Year: 2012).*
DE-102014202230-A1 translation (Year: 2015).*
English Translation of International Search Report issued in PCT/EP2019/065695, dated Aug. 27, 2019.

* cited by examiner

METHOD FOR DETERMINING A CORRECTED WHEEL RADIUS ON THE BASIS OF THE MEASURED YAW RATE

CROSS REFERENCE TO RELATED APPLICATIONS

This application is a U.S. National Stage Entry of International Patent Application Serial Number PCT/EP2019/065695, filed Jun. 14, 2019, which claims priority to German Patent Application No. DE 10 2018 115 043.1, filed Jun. 22, 2018, the entire contents of both of which are incorporated herein by reference.

FIELD

The present disclosure generally relates to a method for determining a wheel radius.

BACKGROUND

The diameter, circumference and radius of a vehicle wheel or tire is necessary to determine a large number of vehicle variables. These include, for example, the wheel speed, the vehicle speed, the distance travelled, the current position of the vehicle or the orientation of the vehicle. The variables specified above are in turn decisive for vehicle systems, such as for example the antilock brake system (ABS), the traction control system (ASR) or the electronic stability program (ESP).

The wheel circumference of a vehicle wheel is defined by the rolling circumference, that is to say the distance which is travelled per revolution of the wheel. The wheel rolling circumferences of each vehicle wheel are not constant and can change, for example, for the following reasons: air pressure fluctuations, fabrication tolerances of the wheels, changes in temperature, wear or changing of the wheel.

German laid-open patent application EP 1 826 530 A1 discloses a method for determining a wheel circumference. This solution proves disadvantageous in that to determine the wheel circumference it is firstly necessary to travel straight ahead for a certain period of time and additionally cornering is also necessary.

Thus, a need exists for an improved method and an improved device for determining a radius of a motor vehicle wheel.

DETAILED DESCRIPTION

Figure 1:
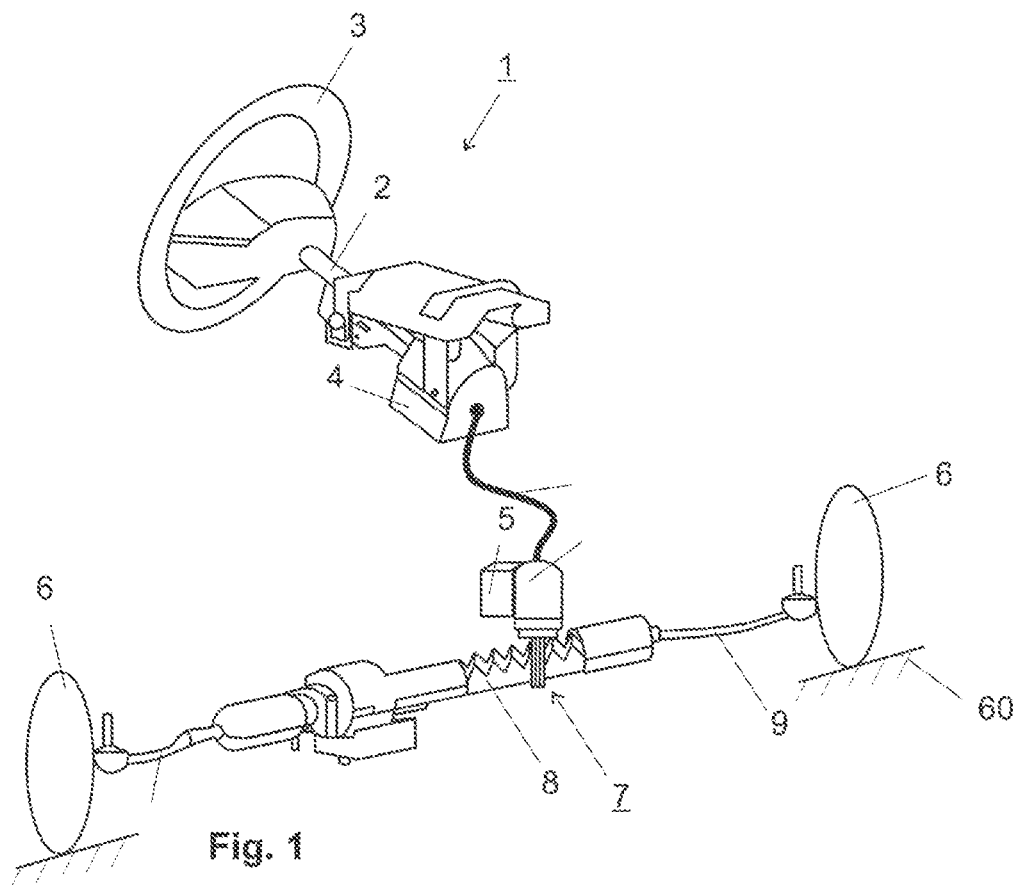
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for determining a wheel radius, to a device for a motor vehicle for determining a wheel radius, and to a steer-by-wire steering system having such a device.

Accordingly, a method for determining a wheel radius of a motor vehicle is provided which has the following steps:
calculating a yaw rate of the motor vehicle by means of a wheel speed of at least one wheel and a predefined wheel radius,
comparing the calculated yaw rate with a measured yaw rate,
adapting the wheel speed, input in the calculation of the yaw rate, of the at least one wheel by means of a correction factor so that the calculated yaw rate is equal to the measured yaw rate,
multiplying the correction factor and the predefined wheel radius and/or the wheel speed, input in the calculation of the yaw rate, for the determination of a corrected wheel radius and/or of a corrected wheel speed.

The method permits the actual wheel radii to be determined easily by determining a respective correction factor.

The determination of the correction factor is preferably carried out for all four wheels. A individual correction factor is therefore obtained for each wheel.

In one preferred embodiment, only the front wheels are steerable. For this case, the correction factors are calculated with the following formula:

$$k_{RR} = \frac{b \cdot \dot{\psi} - k_{FL} \cdot v_{FL} \cdot \cos\delta_{FL}}{-v_{RR}} \text{ with } k_{FL} = \frac{\dot{\psi} \cdot l}{v_{FL} \cdot \sin\delta_{FL}},$$

$$k_{RL} = \frac{b \cdot \dot{\psi} + k_{FR} \cdot v_{FR} \cdot \cos\delta_{FR}}{v_{RL}} \text{ with } k_{FR} = \frac{\dot{\psi} \cdot l}{v_{FR} \cdot \sin\delta_{FR}},$$

where
$v_{FL}$ Wheel speed front left
$v_{FR}$ Wheel speed front right
$v_{RL}$ Wheel speed rear left
$v_{RR}$ Wheel speed rear right
$\delta_{FL}$ Wheel steering angle front left
$\delta_{FR}$ Wheel steering angle front right
l Wheelbase
b Track width In a further preferred embodiment, the respective correction factors are determined for each individual wheel of a rear wheel steering system. For this case, the correction factors are calculated with the following formula:

$$k_{RR} = \frac{-b \cdot \dot{\psi} + \cos\delta_{FL} \cdot \frac{\dot{\psi}(l \cdot \cos\delta_{RR} + b \cdot \sin\delta_{RR})}{\sin(\delta_{RR} - \delta_{FL})}}{v_{RR} \cdot \cos\delta_{RR}} \text{ with } k_{FL} =$$

$$\frac{\dot{\psi} \cdot (l \cdot \cos\delta_{RR} + b \cdot \sin\delta_{RR})}{v_{FL} \cdot \sin(\delta_{RR} - \delta_{FL})},$$

$$k_{RL} = \frac{b \cdot \dot{\psi} + \cos\delta_{FR} \cdot \frac{\dot{\psi}(l \cdot \cos\delta_{RL} + b \cdot \sin\delta_{RL})}{\sin(\delta_{FR} - \delta_{RL})}}{v_{RL} \cdot \cos\delta_{RL}} \text{ with } k_{FR} =$$

-continued $$\frac{\dot{\psi} \cdot (l \cdot \cos\delta_{RL} + b \cdot \sin\delta_{RL})}{v_{FR} \cdot \sin(\delta_{FR} - \delta_{RL})},$$

where
$\delta_{RL}$ Wheel steering angle rear left
$\delta_{RR}$ Wheel steeling angle rear right.

The following measured values are preferably input in the calculation of the correction factors: the yaw rate and the steering wheel angle of the steerable wheels.

It is advantageous if the correction factors are determined only if the measured yaw rate is >0.05°/s and/or the measured yaw acceleration is <0.01°/s². In addition it is preferred that the wheel speed is >0.2 m/s and/or the wheel acceleration is <0.1 m/s².

Furthermore, a device is provided which is configured to carry out the method described above.

In addition, a steer-by-wire steering system is provided for a motor vehicle having this device. It is also conceivable and possible that the method can be used for an electromechanical motor vehicle steering system. It is also conceivable and possible to implement the method for an electromechanical brake, an electric drive or in a rear wheel steering system.

FIG. 1 shows a steer-by-wire steering system 1. A rotational angle sensor (not illustrated), which acquires the driver steering angle which is applied by rotation of a steering input means 3, which is embodied as a steering wheel in the example, is mounted on a steering shaft 2. However, it is also additionally possible to acquire a steering torque. Furthermore, a feedback actuator 4 is mounted on the steering shaft 2, said feedback actuator 4 serving to simulate the reactions from the roadway 60 on the steering wheel 3 and therefore to give the driver feedback about the steering and driving behavior of the vehicle. An electric steering actuator 5 controls the position of the steering wheel 6. The steering actuator 5 acts via a steering rack-steering gear 7, such as for example a toothed rack-steering gear, wherein the toothed rack 8 acts indirectly on the steering wheel 6 via ball joints (not illustrated) with track rods 9 and other components.

Figure 2:
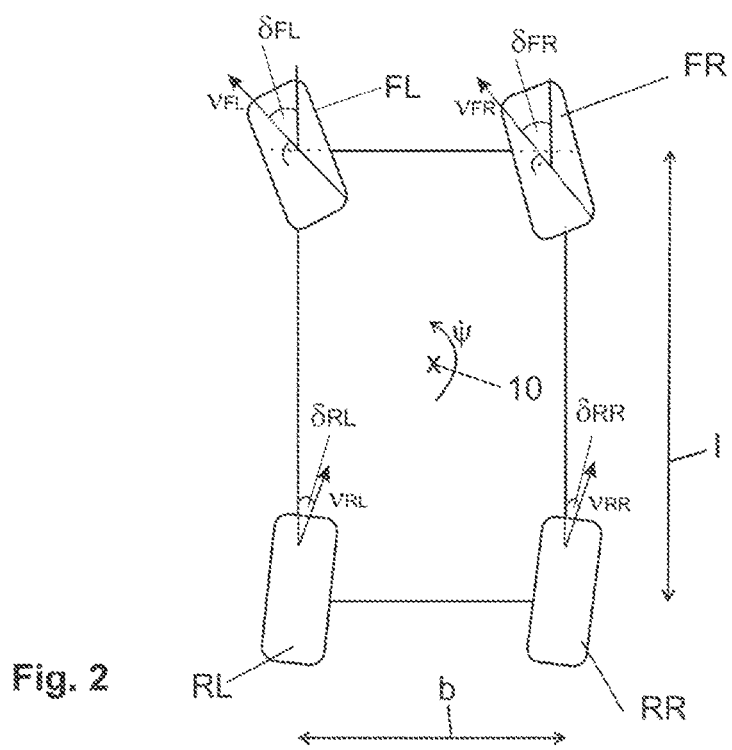
FIG. 2 is a schematic plan view of a motor vehicle.

FIG. 2 illustrates the motor vehicle in a plan view. Provided on a front axle with respect to direction of travel are two steerable front wheels FL, FR which can be pivoted through wheel steering angles $\delta_{FL}$, $\delta_{FR}$. A rear axle has two further non-steerable wheels RL, RR which can be pivoted through wheel steering angles $\delta_{RL}$, $\delta_{RR}$. Each wheel FL, FR, RL, RR is assigned a wheel speed $v_{FL}$, $v_{FR}$, $v_{RL}$, $v_{RR}$. The axles have a wheelbase l. The vehicle has a track width b. The vehicle moves about the vertical axis 10 at an angular speed $\dot{\psi}$, the so-called yaw rate. The vertical axis 10 is here a vertical axis through the center of gravity of the vehicle about which the vehicle rotates during steering movements on its journey. The yaw rate $\dot{\psi}$, the wheel speeds $v_{FL}$, $v_{FR}$, $v_{RL}$, $v_{RR}$ and the wheel steering angles $\delta_{FL}$, $\delta_{FR}$, $\delta_{RL}$, $\delta_{RR}$ are measured and the actual, corrected radii of the vehicle wheels are determined therefrom.

Figure 3:
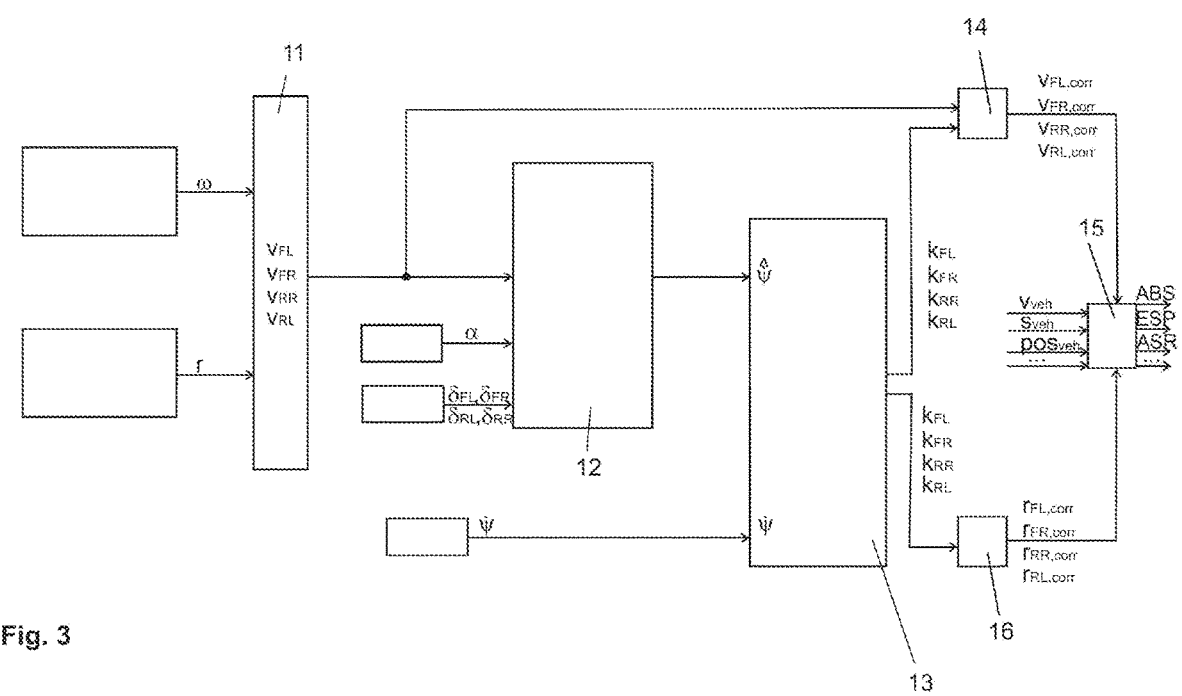
FIG. 3 is a block diagram of a calculation of a corrected wheel speed.

FIG. 3 shows the determination of correction factors $k_{RR}$, $k_{FR}$, $k_{RL}$, $k_{RR}$ of the radii of the motor vehicle wheels FL, FR, RL, RR.

During the determination of the correction factors $k_{RR}$, $k_{FR}$, $k_{RL}$, $k_{RR}$, the validity range is preferably defined by the following conditions:
wheel acceleration $a_{FL}$, $a_{FR}$, $a_{RL}$, $a_{RR}$<0.1 m/s²
wheel speed $v_{FL}$, $v_{FR}$, $v_{RL}$, $v_{RR}$>0.2 m/s
yaw rate $\dot{\psi}$>0.05°/s
yaw acceleration $\ddot{\psi}$<0.01°/s².

The vehicle must move with a relatively high yaw rate and with a relatively low speed so that the sideslip angle remains low. The variables in the equations have the following meaning:
$v_{FL}$ Wheel speed front left
$v_{FR}$ Wheel speed front right
$v_{RL}$ Wheel speed rear left
$v_{RR}$ Wheel speed rear right
$\delta_{FL}$ Wheel steering angle front left
$\delta_{FR}$ Wheel steering angle front right
l Wheelbase
b Track width
$k_{FL}$ Correction factor front left
$k_{FR}$ Correction factor front right
$k_{RL}$ Correction factor rear left
$k_{RR}$ Correction factor rear right
$\dot{\psi}$ Measured yaw rate
$\hat{\dot{\psi}}$ Calculated yaw rate
$\omega$ Wheel speed
$r_{FL}$ Wheel radius front left
$r_{FR}$ Wheel radius front right
$r_{RL}$ Wheel radius rear left
$r_{RR}$ Wheel radius rear right The yaw rate of the motor vehicle about the vertical axis can be calculated from any wheel speed with a defined wheel radius by taking into account the rigid body dynamics.

The wheel speed $\omega$ and a fixed wheel radius value r are used to calculate the wheel speeds in a first step 11.

The speeds of the steerable front wheels are obtained from $$\underline{v}_{FL} = \underline{v}_{RR} + \underline{\omega} \times \underline{r}_{FL}^{RR} \quad \underline{v}_{FR} = \underline{v}_{RL} + \underline{\omega} \times \underline{r}_{FR}^{RL}.$$

The yaw rate of the motor vehicle can be calculated in a second step 12 by resolving the vector equations with a fixed wheel radius value in various ways:

$$\begin{bmatrix} v_{FL} \cdot \cos\delta_{FL} \\ v_{FL} \cdot \sin\delta_{FL} \end{bmatrix} = \begin{bmatrix} v_{RR} \\ \emptyset \end{bmatrix} + \begin{bmatrix} i & j & k \\ 0 & 0 & \hat{\dot{\psi}} \\ l & -b & \emptyset \end{bmatrix} = \begin{bmatrix} v_{RR} + \hat{\dot{\psi}} \cdot b \\ \hat{\dot{\psi}} \cdot l \end{bmatrix},$$

$$\begin{bmatrix} v_{FR} \cdot \cos\delta_{FR} \\ v_{FR} \cdot \sin\delta_{FR} \end{bmatrix} = \begin{bmatrix} v_{RL} \\ \emptyset \end{bmatrix} + \begin{bmatrix} i & j & k \\ 0 & 0 & \hat{\dot{\psi}} \\ l & b & \emptyset \end{bmatrix} = \begin{bmatrix} v_{RL} - \hat{\dot{\psi}} \cdot b \\ \hat{\dot{\psi}} \cdot l \end{bmatrix},$$

$$\hat{\dot{\psi}} = \frac{v_{FL} \cdot \sin\delta_{FL}}{l} \quad \hat{\dot{\psi}} = \frac{v_{FL} \cdot \cos\delta_{RR}}{b},$$

$$\hat{\dot{\psi}} = \frac{v_{FR} \cdot \sin\delta_{FR}}{l},$$

$$\hat{\dot{\psi}} = \frac{-v_{FR} \cdot \cos\delta_{FR} + v_{RL}}{b}.$$

In addition to the calculated wheel speeds, the measured wheel steering angles of the two front wheels $\delta_{FL}$, $\delta_{FR}$ are used for this.

In a subsequent step 13, the calculated yaw rate values $\hat{\dot{\psi}}$ are compared with the measured yaw rate values. The calculated wheel speeds are corrected by multiplication by a correction factor in a further step 14, in such a way that the yaw rates which are calculated from the wheel speeds are equal to the measured yaw rate. Since the wheel speed is known, the correction factors correct the wheel radii.

The correction factors for the four wheels are therefore obtained from:

$$k_{RR} = \frac{b \cdot \dot{\psi} - k_{FL} \cdot v_{FL} \cdot \cos\delta_{FL}}{-v_{RR}} \text{ with } k_{FL} = \frac{\dot{\psi} \cdot l}{v_{FL} \cdot \sin\delta_{FL}},$$

$$k_{RL} = \frac{b \cdot \dot{\psi} + k_{FR} \cdot v_{FR} \cdot \cos\delta_{FR}}{v_{RL}} \text{ with } k_{FR} = \frac{\dot{\psi} \cdot l}{v_{FR} \cdot \sin\delta_{FR}}.$$

In a rear wheel steering system, the respective correction factors for each individual wheel are calculated with the following formula:

$$k_{RR} = \frac{-b \cdot \dot{\psi} + \cos\delta_{FL} \cdot \frac{\dot{\psi}(l \cdot \cos\delta_{RR} + b \cdot \sin\delta_{RR})}{\sin(\delta_{RR} - \delta_{FL})}}{v_{RR} \cdot \cos\delta_{RR}} \text{ with } k_{FL} =$$

$$\frac{\dot{\psi} \cdot (l \cdot \cos\delta_{RR} + b \cdot \sin\delta_{RR})}{v_{FL} \cdot \sin(\delta_{RR} - \delta_{FL})},$$

$$k_{RL} = \frac{b \cdot \dot{\psi} + \cos\delta_{FR} \cdot \frac{\dot{\psi}(l \cdot \cos\delta_{RL} + b \cdot \sin\delta_{RL})}{\sin(\delta_{FR} - \delta_{RL})}}{v_{RL} \cdot \cos\delta_{RL}} \text{ with } k_{FR} =$$

$$\frac{\dot{\psi} \cdot (l \cdot \cos\delta_{RL} + b \cdot \sin\delta_{RL})}{v_{FR} \cdot \sin(\delta_{FR} - \delta_{RL})},$$

where
$\delta_{RL}$ Wheel steering angle rear left
$\delta_{RR}$ Wheel steering angle rear right.

The corrected wheel speeds $v_{FL,corr}$, $v_{FR,corr}$, $v_{RL,corr}$, $v_{RR,corr}$ are subsequently input into the vehicle movement dynamics control systems 15. The corrected wheel radii can also be calculated by multiplication by the corresponding correction factor and used to determine further important vehicle variables, which can then in turn be input into driving assistance systems.

What is claimed is:

1. A method comprising:
   determining a wheel radius of a motor vehicle with steerable front wheels,
   wherein determining the wheel radius includes:
      calculating a yaw rate of the motor vehicle by a wheel speed of at least one wheel which is determined by a predefined wheel radius,
      comparing the calculated yaw rate to a measured yaw rate,
      adapting the wheel speed, input in the calculation of the yaw rate, of the at least one wheel by means of a correction factor so that the calculated yaw rate is equal to the measured yaw rate, and
      multiplying the correction factor and the predefined wheel radius and/or the wheel speed, input in the calculation of the yaw rate, for the determination of a corrected wheel radius and/or of a corrected wheel speed;
   determining a motor vehicle variable based on the corrected wheel radius and/or the corrected wheel speed, wherein the motor vehicle variable is at least one of a vehicle speed, a distance traveled, a current position of the motor vehicle, or an orientation of the motor vehicle;
   providing the motor vehicle variable to an antilock brake system, a traction control system or an electronic stability system; and
   controlling a position of the motor vehicle with the antilock brake system, the traction control system, or the electronic stability system based on the motor vehicle variable,
   wherein the correction factors are calculated with the following formula:

$$k_{RR} = \frac{b \cdot \dot{\psi} - k_{FL} \cdot v_{FL} \cdot \cos\delta_{FL}}{-v_{RR}} \text{ with } k_{FL} = \frac{\dot{\psi} \cdot l}{v_{FL} \cdot \sin\delta_{FL}},$$

$$k_{RL} = \frac{b \cdot \dot{\psi} + k_{FR} \cdot v_{FR} \cdot \cos\delta_{FR}}{v_{RL}} \text{ with } k_{FR} = \frac{\dot{\psi} \cdot l}{v_{FR} \cdot \sin\delta_{FR}},$$

where
$v_{FL}$ Wheel speed front left
$v_{FR}$ Wheel speed front right
$v_{RL}$ Wheel speed rear left
$v_{RR}$ Wheel speed rear right
$\delta_{FL}$ Wheel steering angle front left
$\delta_{FR}$ Wheel steering angle front right
l Wheelbase
b Track width.

2. The method of claim 1 wherein the determination of the correction factor is carried out for all four wheels of the motor vehicle.

3. The method of claim 1 wherein the following measured values are input in the calculation of the correction factors: the measured yaw rate and wheel steering angles of the steerable wheels.

4. The method of claim 1 wherein the correction factors are determined only when the measured yaw rate is $>0.05°/s$.

5. The method of claim 1 wherein the correction factors are determined only when the a measured yaw acceleration is $<0.01°/s^2$.

6. The method of claim 1 wherein the correction factors are determined only when the wheel speed is $>0.2$ m/s.

7. The method of claim 1 wherein the correction factors are determined only if a wheel acceleration is $<0.1$ m/s².

8. A steer-by-wire steering system for a motor vehicle comprising:
   steerable front wheels;
   an antilock brake system, a traction control system, or an electronic stability system; and
   a device that is configured to perform the following steps only when a measured yaw rate is $>0.05°/s$:
      determining a wheel radius of the motor vehicle,
      wherein determining the wheel radius includes:
         calculating a yaw rate of the motor vehicle by a wheel speed of at least one wheel which is determined by a predefined wheel radius,
         comparing the calculated yaw rate to the measured yaw rate,
         adapting the wheel speed, input in the calculation of the yaw rate, of the at least one wheel by means of a correction factor so that the calculated yaw rate is equal to the measured yaw rate, and
         multiplying the correction factor and the predefined wheel radius and/or the wheel speed, input in the calculation of the yaw rate, for the determination of a corrected wheel radius and/or of a corrected wheel speed;
      determining a motor vehicle variable based on the corrected wheel radius and/or the corrected wheel speed, wherein the motor vehicle variable is at least one of a vehicle speed, a distance traveled, a current position of the motor vehicle, or an orientation of the motor vehicle, and providing the motor vehicle variable to the antilock brake system, the traction control system, or the electronic stability system and controlling a position of the motor vehicle with the anti lock brake system, the traction control system, or the electronic stability system based on the motor vehicle variable.

9. The steer-by-wire steering system of claim 8 configured such that the correction factors are determined only when a measured yaw acceleration is <0.01°/s².

10. The steer-by-wire steering system of claim 8 configured such that the correction factors are determined only when the wheel speed is >0.2 m/s.

11. The steer-by-wire steering system of claim 8 configured such that the correction factors are determined only when a wheel acceleration is <0.1 m/s².

12. A method comprising:
   determining a wheel radius of a motor vehicle with steerable front wheels, wherein
      determining the wheel radius includes:
         calculating a yaw rate of the motor vehicle by a wheel speed of at least one wheel which is determined by a predefined wheel radius,
         comparing the calculated yaw rate to a measured yaw rate,
         adapting the wheel speed, input in the calculation of the yaw rate, of the at least one wheel by means of a correction factor so that the calculated yaw rate is equal to the measured yaw rate, and
         multiplying the correction factor and the predefined wheel radius and/or the wheel speed, input in the calculation of the yaw rate, for the determination of a corrected wheel radius and/or of a corrected wheel speed;
   determining a motor vehicle variable based on the corrected wheel radius and/or the corrected wheel speed, wherein the motor vehicle variable is at least one of a vehicle speed, a distance traveled, a current position of the motor vehicle, or an orientation of the motor vehicle;

providing the motor vehicle variable to an antilock brake system, a traction control system, or an electronic stability system; and controlling a position of the motor vehicle with the antilock brake system, the traction control system, or the electronic stability system based on the motor vehicle variable, wherein the correction factors are calculated with the following formula:

$$k_{RR} = \frac{-b \cdot \dot{\psi} + \cos\delta_{FL} \cdot \frac{\dot{\psi}(l \cdot \cos\delta_{RR} + b \cdot \sin\delta_{RR})}{\sin(\delta_{RR} - \delta_{FL})}}{v_{RR} \cdot \cos\delta_{RR}} \text{ with } k_{FL} = \frac{\dot{\psi} \cdot (l \cdot \cos\delta_{RR} + b \cdot \sin\delta_{RR})}{v_{FL} \cdot \sin(\delta_{RR} - \delta_{FL})},$$

$$k_{RL} = \frac{b \cdot \dot{\psi} + \cos\delta_{FR} \cdot \frac{\dot{\psi}(l \cdot \cos\delta_{RL} + b \cdot \sin\delta_{RL})}{\sin(\delta_{FR} - \delta_{RL})}}{v_{RL} \cdot \cos\delta_{RL}} \text{ with } k_{FR} = \frac{\dot{\psi} \cdot (l \cdot \cos\delta_{RL} + b \cdot \sin\delta_{RL})}{v_{FR} \cdot \sin(\delta_{FR} - \delta_{RL})},$$

where
   $\delta_{RL}$ Wheel steering angle rear left
   $\delta_{RR}$ Wheel steering angle rear right.

13. The method of claim 12 wherein the determination of the correction factor is carried out for all four wheels of the motor vehicle.

14. The method of claim 12 wherein the following measured values are input in the calculation of the correction factors: the measured yaw rate and wheel steering angles of the steerable wheels.

15. The method of claim 12 wherein the correction factors are determined only when the measured yaw rate is >0.05°/s.

16. The method of claim 12 wherein the correction factors are determined only when a measured yaw acceleration is <0.01°/s².

17. The method of claim 12 wherein the correction factors are determined only when the wheel speed is >0.2 m/s.

18. The method of claim 12 wherein the correction factors are determined only if a wheel acceleration is <0.1 m/s².

* * * * *